United States Patent Office 3,507,935
Patented Apr. 21, 1970

3,507,935
ACRYLONITRILE POLYMER COMPOSITIONS
AND FIBERS THEREFROM
Zenzi Izumi and Hideji Kitagawa, Masaki-cho, Iyo-gun,
Isao Ito, Matsuyama-shi, and Kazuo Yuki and Hiroo
Hiromoto, Masaki-cho, Iyo-gun, Japan, assignors to
Toyo Rayon Kabushiki Kaisha, Tokyo, Japan, a corporation of Japan
No Drawing. Filed Jan. 22, 1968, Ser. No. 699,329
Claims priority, application Japan, Jan. 24, 1967,
42/4,314, 42/4,316; July 15, 1967, 42/45,313
Int. Cl. C08f 37/18, 29/56
U.S. Cl. 260—898    19 Claims

ABSTRACT OF THE DISCLOSURE

Acrylonitrile polymer compositions having excellent properties for the manufacture of synthetic fibers with improved high and permanent antistatic characteristics and improved dye receptivity, which comprising an acrylonitrile polymer (A) which may contain not more than 60% by weight of a copolymerizable vinyl comonomer, and an acrylonitrile copolymer (B) containing 30 to 80% by weight of a comonomer represented by the following Formula 1:

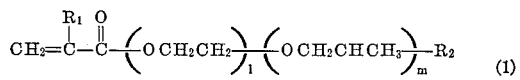
(1)

wherein $R_1$ is a member selected from a hydrogen atom and a lower alkyl group; $R_2$ is a member selected from the group consisting of halogen atoms other than fluorine and organic residues: $l$ is a positive integer having an average value of not less than about 20; and $m$ is zero or a positive integer, which may further contain other copolymerizable vinyl comonomers having an ionizable radical, the amount of $-(OCH_2CH_2)_l$ present in the comonomer of the Formula 1 being in the range of 0.2 to 15% by weight of the total amount of the polymers (A) and (B), and fibers made from such compositions.

---

This invention relates to acrylonitrile polymer compositions having excellent properties for the manufacture of synthetic fibers with improved high and permanent antistatic characteristics and improved dye receptivity, and to fibers made from such compositions. (The term fiber includes yarns, staples and filaments.) More particularly, it relates to acrylonitrile polymer compositions prepared by incorporating an acrylonitrile polymer (A) which may contain not more than 60% by weight, preferably not more than 40% by weight, and particularly not more than 20% by weight, of a copolymerizable vinyl comonomer with an acrylonitrile copolymer (B) which contains 30–80% by weight, preferably 45–65% by weight, of a comonomer expressed by the following Formula 1:

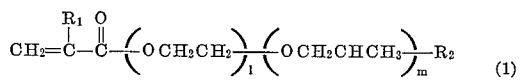
(1)

wherein $R_1$ is a member selected from the group consisting of a hydrogen atom and a lower alkyl group, preferably a methyl group; $R_2$ is a member selected from the group consisting of halogen atoms other than fluorine and organic residues, preferably a hydroxyl group, an alkoxy group having not more than 18 carbon atoms, sulfide having not more than 18 carbon atoms, amino group, phenoxy group, naphthoxy group and their derivatives; $l$ is a positive integer having an average value of not less than about 20, preferably about 20–100, particularly preferably about 25–75; and $m$ is zero or a positive integer, preferably a positive integer having an average value of up to about $\frac{1}{2}$ $l$, and which may further contain other copolymerizable vinyl comonomers having an ionizable radical, the amount of $-(OCH_2CH_2)_l$ in the comonomer of Formula 1 being 0.2–15% by weight, preferably 0.3–10% by weight, of the combined amount of the polymer (A) and copolymer (B), and also to fibers made from such compositions.

Textiles consisting of synthetic fibers made from polymers of acrylonitrile are desirable in warmth retentivity, shrinkability, dimensional stability, weatherability and dyeability, and are used widely in clothing and interior decoration. It is known however that because of lack of the desirable hygroscopic property of wool, and particularly of antistatic characteristics, they have a deficiency of accumulation of excessive electrostatic charges during the spinning of polyacrylonitrile fibers into yarns or during use in garments or carpets. Furthermore, because synthetic fibers made from polymers of acrylonitrile have a high second order transition temperature, it is necessary to adjust the temperature of a dye bath to above 80° C., for instance to a high temperature of 98° C. when they are being dyed. Otherwise, a satisfactory diffusion of a dyestuff into the fibers cannot be attained. As a result of such a high temperature dyeing, there is an unnegligible degree of lowering in elastic tactile hand and durability. Another defect is that even when these synthetic fibers are subjected to an ordinary package dyeing at a temperature of above 80° C., the diffusion of a dye into fibers and its uniformity are bad, and irregularity in dyeing tends to occur.

In an attempt to remove such defects, a proposal has been made heretofore to incorporate into a acrylonitrile polymer an antistatic agent such as a low molecular weight surfactant or a high molecular weight surfactant. The defects of this attempt are an easy removal of the antistatic agent in the case of using the low molecular weight surfactant and the separation of the antistatic agent from the acrylonitrile polymer and the tendency of bleeding out in the case of using the high molecular weight surfactant, and in either case, only a temporary antistatic effect could be obtained.

With a view to maintaining the antistatic effect for a prolonged time, it has also been proposed to modify an acryonitrile polymer itself. An example of such proposal is disclosed in U.S. Patent 3,035,031. This patent discloses a copolymer of acrylonitrile with a compound of the following formula:

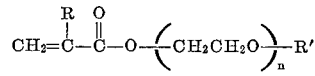

wherein R represents a member of the class consisting of hydrogen and the methyl radical, R' represents an alkyl radical containing from 1 to 4 carbon atoms, and $n$ represents a positive integer having an average value which is at least 5 and not more than about 20, and particularly claims a copolymer having an average molecular weight within the range of from about 25,000 to about 200,000 prepared from 75–99 mol percent of acrylonitrile and 1–15 mol percent of a comonomer of the above formula in which R is hydrogen, R' is a methyl radical, and $n$ is about 7. It is described in this patent that the above-mentioned mol ratio is critical to obtain desired results.

We took interest in acrylonitrile copolymers of this type, and made our researches in this line. It was found as a result that the antistatic effect of fibers made from such prior polymers is low enough to require further improvement, and that they are poor in substantially permanent antistatic characteristics. We then made an effort in developing improved acrylonitrile fibers which have a sufficiently high and permanent antistatic effect and are free from the above-mentioned defects incident to the dyeing operation. Consequently, we knew quite unexpectedly that even if fibers are made from a copolymer in which a comonomer unit closely related to the imparting of antistatic effect is relatively uniformly distributed in an acrylonitrile polymer composition, the above-mentioned remarkable improvements cannot substantially be achieved, and that in the fibers made from a polymer composition prepared by blending an acrylonitrile polymer with such copolymer, particularly an acrylonitrile copolymer containing a great quantity of the comonomer represented by the above Formula 1, the copolymer is non-uniformly dispersed in the acrylonitrile polymer and the antistatic characteristics not exhibited by the copolymer alone and their substantially permanent retention can be achieved.

Accordingly, an object of this invention is to provide remarkably improved polymer compositions having high and permanent antistatic characteristics in which the comonomer of the Formula 1 with a specific amount of $\text{-(OCH}_2\text{CH}_2\text{)}_1$ is incorporated in the acrylonitrile polymer, fibers obtained from such compositions, and a method of their manufacture.

Many other objects and advantages of this invention will become more apparent from the description which follows.

The compositions of this invention is obtained by blending an acrylonitrile polymer (A) which may contain not more than 60% by weight of a copolymerizable vinyl comonomer (except the compound of Formula 1 mentioned above) with the acrylonitrile copolymer (B) in a manner such that the $\text{-(OCH}_2\text{CH}_2\text{)}_1$ in the comonomer of Formula 1 may be 0.2–15% by weight, preferably 0.3–10% by weight, of the combined amount of the above (A) and (B).

The acrylonitrile polymer (A) may be a polymer containing a copolymerizable vinyl comonomer in addition to an acrylonitrile homopolymer. The acrylonitrile polymer (A) therefore includes a copolymer (A') of acrylonitrile with other copolymerizable vinyl comonomer (excepting the compound of Formula 1 and a blend of the acrylonitrile polymer (A) with the copolymer (A'). As such copolymer (A'), there can be used a copolymer (A") of acrylonitrile with other copolymerizable vinyl comonomer having an ionizable radical particularly advantageously to improve the dyeability.

As other copolymerizable vinyl comonomer having an ionizable radical, we can mention vinyl comonomers having a carboxylic acid group such as acrylic acid, methacrylic acid and itaconic acid; vinyl comonomers having a sulfonic acid group such as vinylsulfonic acid, allylsulfonic acid, methallylsulfonic acid and styrenesulfonic acid; and salts of the above compounds in which the acid group is in the form of an alkali metal salt, ammonium salt, alkaline earth metal salt and amine salt, and comonomers having an ionizable cationic radical, for instance, vinyl pyridine, 2-methyl-5-vinyl pyridine and diethylaminoethyl methacrylate.

The other useable copolymerizable vinyl comonomers, although not belonging to the other copolymerizable vinyl comonomers having an ionizable radical described in the present invention, includes methyl acrylate, methyl methacrylate, vinyl acetate, vinyl chloride and vinylidene chloride.

The acrylonitrile copolymer of the composition of this invention will now be further described.

As the acrylonitrile copolymer (B) containing 30–80% by weight preferably 45–65% by weight of the comonomer of the Formula 1, there can be cited a copolymer (B') composed of the comonomer of Formula 1 with acrylonitrile, a copolymer (B") composed of the comonomer of Formula 1, other copolymerizable vinyl comonomer having an ionizable radical and acrylonitrile, and a blend of the copolymer (B') or (B") with a copolymer of acrylonitrile and other copolymerizable vinyl monomer having an ionizable radical. A small amount of other copolymerizable vinyl comonomer having no ionizable radical may be copolymerized. Examples of the compound of the Formula 1 which is present in the acrylonitrile copolymer (B) in a chemically bound form are as follows:

| Compound | Name |
|---|---|
| $CH_2=\overset{H}{\underset{\|}{C}}-\underset{\|\|}{C}(OC_2H_4)_{10}OH$ | Polyethylene glycol acrylate. |
| $CH_2=\overset{H}{\underset{\|}{C}}-\underset{\|\|}{C}(OC_2H_4)_{10}OCH_3$ | Methoxy polyethylene glycol acrylate. |
| $CH_2=\overset{H}{\underset{\|}{C}}-\underset{\|\|}{C}(OC_2H_4)_{10}OC_3H_7$ | Propoxy polyethylene glycol acrylate. |
| $CH_2=\overset{CH_3}{\underset{\|}{C}}-\underset{\|\|}{C}(OC_2H_4)_{10}OH$ | Polyethylene glycol methacrylate. |
| $CH_2=\overset{CH_3}{\underset{\|}{C}}-\underset{\|\|}{C}(OC_2H_4)_{10}OCH_3$ | Methoxy polyethylene glycol methacrylate. |
| $CH_2=\overset{CH_3}{\underset{\|}{C}}-\underset{\|\|}{C}(OC_2H_4)_{10}OC_4H_9$ | Butoxy polyethylene glycol methacrylate. |
| $CH_2=\overset{C_2H_5}{\underset{\|}{C}}-\underset{\|\|}{C}(OC_2H_4)_{10}OCH_3$ | Methoxy polyethylene glycol ethacrylate. |
| $CH_2=\overset{C_2H_5}{\underset{\|}{C}}-\underset{\|\|}{C}(OC_2H_4)_{10}OC_3H_7$ | Propoxy polyethylene glycol ethacrylate. |
| $CH_2=\overset{H}{\underset{\|}{C}}-\underset{\|\|}{C}(OC_2H_4)_1(OC_3H_6)_mOCH_3$ | Methoxy polypropylene glycol polyethylene glycol acrylate. |
| $CH_2=\overset{H}{\underset{\|}{C}}-\underset{\|\|}{C}(OC_2H_4)_{10}Cl$ | Chloropolyethylene glycol acrylate. |
| $CH_2=\overset{CH_3}{\underset{\|}{C}}-\underset{\|\|}{C}(OC_2H_4)_1SC_{12}H_{25}$ | Dodecylmercapto polyethylene glycol methacrylate. |
| $CH_2=\overset{CH_3}{\underset{\|}{C}}-\underset{\|\|}{C}(OC_2H_4)_1N(C_2H_5)_2$ | Diethylamino polyethylene glycol methacrylate. |
| $CH_2=\overset{H}{\underset{\|}{C}}-\underset{\|\|}{C}(OC_2H_4)_{10}-\text{C}_6\text{H}_4-C_8H_{17}$ | Octyl phenoxy polyethylene glycol acrylate. |
| $CH_2=\overset{CH_3}{\underset{\|}{C}}-\underset{\|\|}{C}(OC_2H_4)_{10}-\text{naphthyl}$ | Naphthoxy polyethylene glycol methacrylate. |

The compound of the Formula 1 to be utilized for the manufacture of the acrylonitrile copolymer (B) of this invention can be prepared easily by the method described in the above-mentioned U.S. Patent 3,035,031 and other methods. A suitable catalyst such as potassium hydroxide and sodium hydroxide is added to a compound having an active hydrogen such as water, alcohols, mercaptans, amines phenol, naphthol and their derivatives and the mixture is put into an autoclave. $H(OC_2H_4)_1(OC_3H_6)_mR_2$ results when ethylene oxide is blown into the autoclave after the blowing of propylene oxide, and when ethylene oxide is blown into it without the introduction of propylene oxide, $H(OC_2H_4)_l R_2$ results.

$$H(OC_2H_4)_l(OC_3H_6)_m R_2$$

or $H(OC_2H_4)_l R_2$ is, if desired, diluted with a suitable inert solvent such as benzene and toluene, and $$CH_2=\underset{\underset{O}{\|}}{\underset{|}{C}}-\underset{R_1}{C}-OR_3$$

($R_3$ is, in most cases, $CH_3$ or $C_2H_5$) is added. Ester interchange reaction is carried out on addition of an ester exchange catalyst such as $H_2SO_4$ and a polymerization inhibitor such as hydroquinone and pyrogallol, and the compound of the Formula 1 is obtained. An example of the manufacture of the compound of Formula 1 is described in Example 1.

In the compound of the Formula 1, $l$ is a positive integer having an average value of not less than about 20, preferably about 20–100, particularly preferably about 25–75. The compound expressed by the Formula 1 is contained in the acrylonitrile copolymer (B) in an amount of 30–80% by weight, preferably 45–65% by weight. The use of the acrylonitrile copolymer (B) containing a compound of the Formula 1 having the longest possible $-(OCH_2CH_2)_l$ repeating units at the highest possible ratio is related with the nonuniformity of the dispersion of the copolymer (B) into the acrylonitrile polymer (A) and seems to be helpful, together with other conditions, in exhibiting high and permanent antistatic characteristics.

When the compound of the Formula 1 has an $l$ of below about 20 and/or the content of the compound of Formula 1 is outside the above specified range, there are obtained only very inferior results in respect of the degree of antistatic characteristics, and/or their permanent retention, and/or spinability of the fibers made from the above polymer compositions. For instance, the use of the copolymer (B) containing less than 30% by weight of the compound of the Formula 1 cannot give excellent antistatic characteristics intended by the present invention even if the copolymer (B) satisfies the above-mentioned condition of $l$ and is incorporated into the polymer (A) in so great a quantity as to cause a substantial loss of desirable properties of acrylonitrile fibers, and the obtained product is substantially useless as fibers. On the other hand, the copolymer (B) containing more than 80% by weight of the compound of the Formula 1 is easily gelled, and makes the spinning operation difficult or even impossible. In addition, it easily causes bleeding out and a permanent antistatic effect cannot be obtained.

If the acrylonitrile copolymer (B) provided with the above-mentioned requirements alone is spun, the resulting fibers have only an unsatisfactory and temporary antistatic effect. In view of this, it is surprising that fibers obtained from a blend of the above copolymer (B) with the polymer (A) having no antistatic characteristics exhibit a high and permanent antistatic effect. The cause of such unexpected result is not clear, but it appears that it is related with the tendency of the acrylonitrile copolymer (B) to be dispersed in the acrylonitrile polymer (A) with appropriate non-uniformity and with hardly any tendency of the acrylonitrile copolymer (B) to bleed out. As a matter of course, the invention is in no way limited by such conjecture of the cause.

It is necessary, according to this invention, to incorporate the acrylonitrile copolymer (B) having no high permanent antistatic characteristics with the acrylonitrile polymer (A) having no antistatic characteristics in a manner such that the amount of $-(OCH_2CH_2)_l$ present in the comonomer of the Formula 1 may be 0.2–15% by weight, preferably 0.3–10% by weight, based on the combined amount of the polymer (A) and the copolymer (B). Fibers obtained from an acrylonitrile polymer composition in which the acrylonitrile copolymer (B) is incorporated in a manner such that the amount of $$-(OCH_2CH_2)_l$$

may be in the range of 2 to 10% by weight have a very excellent antistatic effect, and can be dyed at low temperatures, different from the prior acrylonitrile fibers which cannot.

If the amount of $-(OCH_2CH_2)_l$ is less than 0.2% by weight, a sufficient antistatic effect cannot be obtained, and if this amount exceeds 15% by weight, there is a substantial deterioration in the physical properties of the resulting fibers such as heat stability and water-proofness, which in the extreme cases will result in the loss of value as fibers. Furthermore, in the latter case, the spinability of the resulting polymer composition is worsened, and it becomes difficult or even impossible to form such composition into fibers.

As already mentioned above, if the acrylonitrile polymer (A) and/or acrylonitrile copolymer (B) has other vinyl comonomers having an ionizable radical (may be abbreviated to comonomer (ion) below), it is possible to make a more improved composition. Several examples of such composition are as follows:

(i) A ternary blend composed of acrylonitrile polymer (A) with or without the comonomer (ion), acrylonitrile copolymer (B) of acrylonitrile with the compound of Formula 1, and copolymer (A″) of acrylonitrile with the comonomer (ion).

(ii) A blend composed of acrylonitrile polymer (A) with or without the comonomer (ion), and acrylonitrile copolymer (B) of acrylonitrile with the compound of the Formula 1 and the comonomer (ion).

(iii) A ternary blend composed of acrylonitrile polymer (A) with or without the comonomer (ion), acrylonitrile copolymer (B) consisting of acrylonitrile, the compound of the Formula 1 and the comonomer (ion), and copolymer (A″) of the comonomer (ion) with acrylonitrile.

(iv) A ternary blend composed of acrylonitrile polymer (A) having the comonomer (ion), copolymer (B) of the compound of the Formula 1 with acrylonitrile with or without the comonomer (ion), or a blends of (A) and (B), and copolymer (A″) of the comonomer (ion) with acrylonitrile.

These blends are in common in that they contain an acrylonitrile copolymer having the comonomer (ion). They are advantageous for further improvement of permanent antistatic characteristics, and serve for the improvement of spinability and resistance to loss of transparency in the formation of fibers. The above blends (iv), in which the comonomer (ion) is copolymerized in the acrylonitrile polymer (A), is necessary for imparting dyeability, particularly dyeability at low temperatures.

The amount of the other copolymerizable vinyl monomer having an ionizable radial differs depending upon the acrylonitrile polymers (A), (B) and (C). It is desirable that the amount of the comonomer (ion) in the acrylonitrile polymer (A) necessary to impart low temperature dyeability is 0.1–2.0 mol percent for an anionic comonomer and 0.4–4 mol percent for a cationic comonomer. If the amount of the comonomer (ion) is less than the above specified lower limits, no sufficient dyeing effect can be obtained, and if it exceeds the above specified upper limits, the resulting compositions, when made into fibers, tends to be tacky, bad in appearance and feel, and easily colored.

When the comonomer (ion) is incorporated into the copolymer (B) for the improvement of permanent antistatic characteristics, its amount should preferably be 0.5–10 mol percent of the copolymer (B). If the amount of the comonomer (ion) is less than 0.5 mol percent, the effect imparted is not so remarkable, and if it is above 10 mol percent, the copolymer (B) gets nearly water-soluble and gives only a little effect. When the comonomer (ion) is incorporated into the copolymer (A″), its amount should preferably be 5–15 mol percent of the copolymer (A″). If the amount of the comonomer (ion) is less than 5 mol percent, the effect imparted is not so remarkable, and if it is above 15 mol percent, the copolymer (A″) gets nearly water-soluble and gives only a little effect.

It is not clear why the binding of the other vinyl comonomer having an ionizable radical in an acrylonitrile polymer or copolymer gives rise to improvements, but it is presumed that the ionizable radical exhibits functions in favor of the facilitating of an antistatic effect resulting from the presence of the compound of the Formula 1, the prevention of occurring electrostatic charges, and of the removal of electrostatic charges.

The acrylonitrile polymer (A) or the acrylonitrile copolymer (B) used in this invention can be manufactured by the methods known per se and their modifications. For example, we can cite emulsion polymerization and suspension polymerization to be carried out in water, and a homogeneous solution polymerization to be carried out in dimethyl sulfoxide, ethylene carbonate, dimethyl formamide or an aqueous solution of zinc chloride. The preparation of the compositions of the present invention can be effected by mixing the desired polymers or copolymers each separately prepared, and if desired, by a method of making any one or two of the copolymers co-present before or during the polymerization of the other one or two copolymers. At any rate, it is sufficient that a final acrylnitrile polymer composition is as defined above, and the preparation of the composition is in no way restricted by the order of compounding, the time of compounding or the method of preparation.

The polymers (A) and (B) of the present invention are soluble in various solvents such as dimethyl sulfoxide, dimethyl formamide, dimethyl acetamide, an aqueous solution of zinc chloride and an aqueous solution of rhodanate, which are known as solvents for acrylonitrile polymers. By using a solution of the acrylonitrile polymer compositions in such solvent, acrylonitrile fibers can be manufactured by a wet or dry spinning procedure. The fibers of this invention include composite fibers in which the composition of the present invention is one component.

As the acrylonitrile copolymer (B), especially preferably used is one having an intrinsic viscosity of at least 0.8 measured in 0.1 N dimethyl formamide solution of sodium rhodanate at 25° C. Fibers made from a composition in which the copolymer (B) having an intrinsic viscosity far below 0.8 is blended with the acrylonitrile polymer (A) have a deteriorated antistatic property, tend to be deprived of transparency, and are likely to have voids within.

It is especially desired in this invention that the copolymer having the comonomer component expressed by the Formula 1 is nonuniformly dispersed in the composition or an article shaped from it. As mentioned above, the said copolymer provided with the specific requirements of this invention, although for unknown reasons, tend to be non-uniformly dispersed in an acrylonitrile polymer, and directly contributes to the improvement of the antistatic characteristics intended by this invention. Better results are obtained when the blending is effected so as to satisfy the relation of degree of turbidity expressed by the following Formula 2.

$$\frac{T_1}{T_2} \times 100 \leqq 90\% \text{ (preferably } 80\%)\quad(2)$$

wherein $T_1$ is the degree of transmission percent at 550 m$\mu$ of a solution of the compositions in 20 wt. percent dimethyl sulfoxide, and $T_2$ is the degree of transmission percent at 550 m$\mu$ of a solution of the acrylonitrile polymer (A) which constitutes the compositions.

In order to impart low temperature dyeability together with permanent antistatic characteristics to fibers made from the compositions of this invention, it is especially desirable that the acrylonitrile polymer (A) contains the comonomer (ion) in an amount of at least $1 \times 10^{-5}$ milli-equivalent/g., the acrylonitrile copolymer (B) contains 2–10% by weight of $\pm OCH_2CH_2\pm_l$ of the comonomer expressed by the Formula 1, and the above Formula 2 is satisfied.

This invention will now be described by working examples, in which parts are by weight unless otherwise specified.

EXAMPLE 1

The mixture consisting of 400 parts of toluene, 200 parts of methoxy polyethylene glycol, 50 parts of methyl acrylate, 2 parts of sulfuric acid, 1.5 parts of pyrogallol, and 0.5 part of hydroquinone was put into a distillation device, and refluxed for 15 hours to remove methanol in the form of an azeotropic mixture. Reaction was effected for 3 hours while maintaining the temperature at 120° C. The obtained product was washed with 5 times its volume of an alkaline aqueous solution to remove the sulfuric acid, pyrogallol and hydroquinone. The toluene and the unreacted methyl acrylate were removed further under a reduced pressure, and a solid was obtained. It was confirmed by the dodecyl mercaptan method that the obtained solid is methoxy polyethylene glycol acrylate having a double linkage of 94% and an OH value of 2%. By using methoxy polyethylene glycol acrylate obtained in accordance with the above procedure, each of the spinning solutions of the following recipe was prepared. Tows (3d x 200) were obtained by spinning under the same wet-spinning conditions.

(A) Example 1, present invention 94 parts of a homopolymer of acrylonitrile, 6 parts of a copolymer of 3 parts of acrylonitrile and 3 parts of methoxypolyethylene glycol acrylate ($l=30$), and 400 parts of dimethyl sulfoxide.

(B) Comparative Example 1

Copolymer of 97 parts of acrylonitrile and 3 parts of methoxypolyethylene glycol acrylate ($l=30$), and 400 parts of dimethyl sulfoxide.

(C) Comparative Example 2

94 parts of a homopolymer of acrylonitrile, 6 parts of a copolymer of 3 parts of acrylonitrile and 3 parts of methoxypolyethylene glycol acrylate ($l=10$), and 400 parts of dimethyl sulfoxide.

(D) Comparative Example 3

Copolymer of 97 parts of acrylonitrile and 3 parts of methoxypolyethylene glycol acrylate ($l=10$), and 400 parts of dimethyl sulfoxide.

(E) Control

Homopolymer containing 100 parts of acrylonitrile, and 400 parts of dimethyl sulfoxide.

The antistatic effect was determined with respect to the so prepared tows by the following test methods. The results are shown in the following table.

Measurement of antistatic effect (i) Frictional voltage: Tows of 90,000 denier arranged in a form of cloth are mounted on a rotary static tester, and rubbed with a spun woven fabric of polyester at a rate of 700 times per minute. The voltage that occurs at this at 25° C. and a relative humidity of 40% is measured.

(ii) Half life: The period from the removal of the rubbed cloth in the above measurement until the voltage is reduced to half of its original value.

(iii) Ash test: The same tows of 90,000 denier used in the measurement of frictional voltage are vigorously rubbed with a spun polyester woven fabric, and brought close to a fresh tobacco ash. The distance from the tobacco ash to a point at which the tows attract the tobacco ash is measured.

Measurement of maintenance of the antistatic effect

The twos are washed 20 times by an electric washer under the following conditions.

Washing conditions:
Detergent, anionic surface active agent—3 g./l.
Bath ratio—1:40
Bath temperature—40° C.
Time—washed for 30 minutes and then washed with water for 5 minutes The sample is dried overnight in a vacuum drier, and left to stand in a room at 25° C. and a relative humidity of 40% for three days.

| Test Items | Control | Ex. 1 | Comparative Ex. 1 | Ex. 2 | Ex. 3 |
|---|---|---|---|---|---|
| Frictional voltage (volt) | 7,000 | 1,500 | 6,500 | 6,500 | 6,800 |
| Half life (second) | (1) | 12 | (1) | 180 | (1) |
| Ash test (cm.) | 8 | 1.2 | 8 | 7 | 8 |
| After washing: | | | | | |
| Frictional voltage (volt) | 8,500 | 1,300 | 8,000 | 7,200 | 8,300 |
| Half life (second) | (1) | 10 | (1) | 190 | (1) |
| Ash test (cm.) | 8 | 1 | 8 | 7 | 8 |

[1] Above 300.

EXAMPLE 2

Acrylonitrile and

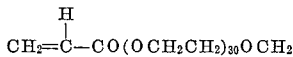

in each of the following proportions (percent by weight) were polymerized in dimethyl sulfoxide with the use of azobisisobutyronitrile as a polymerization initiator.

| | $(OCH_2CH_2)_{30}$ | Acrylonitrile |
|---|---|---|
| A (comparison) | 20 | 80 |
| B | 30 | 70 |
| C | 40 | 60 |
| D | 50 | 50 |
| E | 60 | 40 |
| F | 70 | 30 |
| G | 80 | 20 |
| H (comparison) | 100 | 0 |

Each of the polymers A to H was mixed with a polymer obtained by polymerizing 95% by weight of acrylonitrile and 5% by weight of vinyl acetate so that $\text{+}(OCH_2CH_2\text{+})_{30}$ might be 2% by weight of the total amount of the polymers. Spinning solutions A' to H' were prepared by dissolving the above polymers in four times their weight of dimethyl sulfoxide. Tows were prepared by spinning in the same manner as described in Example 1, and the antistatic effect was measured by the same testing procedures. The results are as follows:

| Spinning solution | Frictional voltage (volt) | Half life (second) | Ash test (cm.) | Turbidity |
|---|---|---|---|---|
| A' (comparison) | 6,500 | (1) | 7.0 | 97 |
| B' | 4,600 | 120 | 5.0 | 90 |
| C' | 2,500 | 40 | 3.5 | 88 |
| D' | 1,600 | 13 | 1.2 | 65 |
| E' | 1,300 | 10 | 0.8 | 58 |
| F' | 2,000 | 32 | 2.5 | 59 |
| G' | 3,500 | 45 | 3.5 | 62 |
| H' (comparison) | 6,500 | 250 | 6.5 | 65 |
| I' (control) | 6,500 | (1) | 7.0 | 100 |

[1] Above 300.

It is seen from the above results that when a polymer having 30–80% by weight of

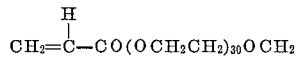

is used, there is an appreciable antistatic effect, and when its amount is less than 30% by weight or more than 80% by weight, the effect is only a little, and that when its amount is 45–65% by weight, there is a remarkable effect.

EXAMPLE 3

Acrylonitrile and $$CH_2=\overset{R_1}{\underset{|}{C}}-CO(OCH_2CH_2)_{30}R_2$$

(with substituents indicated below) were copolymerized with each other in dimethyl sulfoxide in the presence of azobisisobutyronitrile as a polymerization initiator in a manner such that the amount of $\text{+}(OCH_2CH_2\text{+})_{30}$ might be 55% by weight.

| | $R_1$ | $R_2$ |
|---|---|---|
| A | H | $OCH_3$ |
| B | $CH_3$ | $OCH_3$ |
| C | $CH_3$ | $OC_3H_7$ |
| D | $CH_3$ | $SC_{12}H_{25}$ |
| E | $CH_3$ | $N(C_2H_5)_2$ |
| F | $CH_3$ | $O-\phenyl$ |
| G | $CH_3$ | $O-\text{naphthyl}$ |
| H | $CH_3$ | $O-\phenyl-C_8H_{17}$ |
| I | $CH_3$ | $Cl$ |
| J | $C_2H_5$ | $OCH_3$ |

Each of the so obtained polymers A to J was mixed with a polymer obtained by polymerising 93% by weight of acrylonitrile with 7% by weight of methyl acrylate in a manner such that the amount of $\text{+}(OCH_2CH_2\text{+})_{30}$ might be 2% by weight of the total amount of these polymers. Spinning solutions A' to J' were prepared by dissolving the above polymers in four times their weight of dimethyl sulfoxide. Tows were prepared by spinning in the same manner as described in Example 1, and the antistatic effect was measured by the same testing procedures. The results are as follows:

| Spinning solution | Frictional voltage (volt) | Half life (second) | Ash test (cm.) |
|---|---|---|---|
| A' | 1,600 | 14 | 1.5 |
| B' | 1,500 | 13 | 1.3 |
| C' | 1,700 | 15 | 1.7 |
| D' | 1,800 | 16 | 2.0 |
| E' | 1,700 | 13 | 1.5 |
| F' | 1,800 | 14 | 1.7 |
| G' | 1,850 | 15 | 2.0 |
| H' | 1,500 | 13 | 1.4 |
| I' | 1,800 | 15 | 1.8 |
| J' | 1,600 | 15 | 1.7 |
| K[1] (control) | 6,500 | (1) | 7.5 |

[1] Above 300.

It is seen from the above results that the antistatic effect does not depend much upon the type of substituents.

EXAMPLE 4

Acrylonitrile and $$CH_2=\overset{H}{\underset{|}{C}}-CO(OCH_2CH_2)_{30}$$

in a proportion of 50:50 were polymerized with each other in dimethyl sulfoxide in the presence of azobisisobutyronitrile as a polymerization initiator. The obtained polymer was blended with a polymer prepared by polymerizing 95% by weight of acrylonitrile with 5% by weight of methyl acrylate in a manner such that the content of $\text{+}(OCH_2CH_2\text{+})_{30}$ in weight percent might be as indicated below. Spinning solutions A to I were prepared by dissolving these polymers in four times their weight of dimethyl sulfoxide.

Spinning solution:  Content of $\{OCH_2CH_2\}_1$

| Spinning solution | Content of $\{OCH_2CH_2\}_1$ |
|---|---|
| A (comparison) | 0.1 |
| B (comparison) | 0.15 |
| C | 0.2 |
| D | 0.3 |
| E | 2 |
| F | 5 |
| G | 10 |
| H | 14 |
| I (comparison) | 17 |

Tows were prepared from the above spinning solutions under the same conditions as in Example 1, and the antistatic effect, spinability and turbidity were determined. The results are as follows:

| Spinning Solution | Frictional voltage (volt) | Half life (second) | Ash test (cm.) | Spinability[1] (m./min.) | Turbidity |
|---|---|---|---|---|---|
| A | 4,900 | 120 | 6.8 | 15 | 96 |
| B | 4,000 | 105 | 6.0 | 15 | 93 |
| C | 2,900 | 45 | 3.5 | 15 | 90 |
| D | 2,500 | 30 | 2.5 | 15 | 82 |
| E | 1,500 | 13 | 1.3 | 14 | 65 |
| F | 800 | 7 | 0 | 13 | 43 |
| G | 300 | 5 | 0 | 11 | 30 |
| H | 200 | 2 | 0 | 8 | 22 |
| I | 140 | 1 | 0 | 5 | 15 |
| J (control) | 6,500 | (²) | 7.0 | 15 | 100 |

[1] The spinability is expressed in terms of the maximum take-up speed within a range where no yarn breakage occurs, when the spinning solution is spun through a spinneret with 200 holes having a diameter of 0.08 mm. into a 50% aqueous solution of dimethyl sulfoxide at 25° C.
² Above 300.

It is seen from the above results that if the content of $\{OCH_2CH_2\}_{30}$ is above 0.2%, particularly above 0.3%, a considerable effect is appreciable, and a better result is obtained when the amount is more. The increase in the amount, however, makes the spinability worse, and in view of this, the amount below 15%, particularly below 10%, is preferable.

EXAMPLE 5

Acrylonitrile was copolymerized with

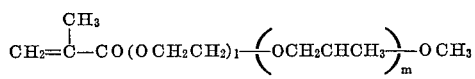

(with different $l$ and $m$ indicated below) in dimethyl sulfoxide in the presence of azobisisobutyronitrile as a polymerization initiator in a manner such that the $\{OCH_2CH_2\}_1$ might be present in an amount of 50% by weight.

|  | $l$ | $m$ |
|---|---|---|
| A (comparison) | 10 | 0 |
| B | 20 | 0 |
| C | 30 | 0 |
| D | 70 | 0 |
| E | 90 | 0 |
| F | 150 | 9 |
| G | 30 | 10 |
| H | 30 | 20 |

Each of the so obtained polymers A to H was mixed with a polymer prepared by polymerizing 93% by weight of acrylonitrile, 6% by weight of methyl acrylate and 1% by weight of sodium styrene sulfonate in dimethyl sulfoxide in a manner such that the amount of $\{OCH_2CH_2\}_1$ ($l$ is above 20, preferably about 25–75) might be 2% by weight of the total amount of these polymers. Spinning solutions A' to H' were prepared by dissolving the polymers into four times their weight of dimethyl sulfoxide. Tows were prepared in the same manner as described in Example 1, and the antistatic effect was determined by the same testing procedures. The results are as follows:

| Spinning solution | Frictional voltage (volt) | Half life (second) | Ash test (cm.) |
|---|---|---|---|
| A' (comparison) | 6,000 | (¹) | 6.5 |
| B' | 2,400 | 18 | 2.2 |
| C' | 1,500 | 13 | 1.3 |
| D' | 1,700 | 16 | 1.7 |
| E' | 2,000 | 19 | 2.0 |
| F' | 1,800 | 15 | 1.8 |
| G' | 2,500 | 18 | 2.2 |
| H' | | | |
| I' (control) | 6,500 | (²) | 7.5 |

¹ Above 180.
² Above 300.

It is seen from the above results that $\{OCH_2CHCH_3\}_m$ has only a little effect of imparting antistatic properties. When $m$ is $\frac{1}{2}l$, there is hardly no change in effect, and when $m \geq \frac{1}{2}l$, the antistatic effect tends to be rather lower.

EXAMPLE 6

A mixture of acrylonitrile with methoxy polyethylene glycol methacrylate

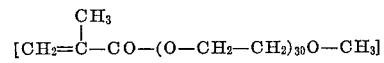

in a proportion of 40 to 60 was dissolved into dimethyl sulfoxide, and 0.02 mol/l. of azobisisobutyronitrile was added as a catalyst. Polymerization was effected at 50° C. for 38 hours with the monomer concentration and the amount of dodecylmercaptan varied. Polymers with a different intrinsic viscosity were obtained as tabulated below.

| Polymers | Monomer concentration (mol/liter) | Amount added of dodecyl mercaptan (wt. percent/monomer) | Intrinsic viscosity[1] |
|---|---|---|---|
| A | 1.0 | 1.2 | 0.45 |
| B | 1.0 | 0.3 | 0.76 |
| C | 1.2 | 0 | 1.00 |
| D | 1.5 | 0.1 | 1.41 |
| E | 2.0 | 0.3 | 1.88 |

[1] The intrinsic viscosity was measured with respect to a solution of the copolymer in 0.1 N dimethyl formamide solution of sodium rhodamate at 25° C.

Each of the above polymers A to E was blended with a copolymer solution obtained by polymerizing 94 parts of acrylonitrile, 5 parts of methyl acrylate and one part of sodium methallylsulfonate in 400 parts of dimethyl sulfoxide in a manner such that the amount of the polyethylene glycol portion of the methoxy polyethylene glycol acrylate might be 3% and 6%. The blend was spun, washed with water, drawn, relaxed, dried, and heat treated in accordance with an ordinary method. A knitted fabric was made from the resulting fibers. The frictional voltage and half life of this fabric together with those of a fabric knitted (control) from ordinary acrylonitrile fibers containing no antistatic agent specified in the present invention were measured. The results are shown below.

| Spinning solution | Amount of polyethylene glycol portion (wt. percent) | Frictional voltage (volt) | Half life (second) |
|---|---|---|---|
| Control | 0 | 7,500 | (¹) |
| A | 3 | 7,000 | 95 |
|   | 6 | 6,500 | 65.0 |
| B | 3 | 4,500 | 50.0 |
|   | 6 | 3,500 | 35.0 |
| C | 3 | 3,000 | 25.0 |
|   | 6 | 2,000 | 7.0 |
| D | 3 | 1,900 | 11.0 |
|   | 6 | 400 | 5.5 |
| E | 3 | 1,200 | 8.0 |
|   | 6 | 210 | 7.0 |

¹ Above 300.

It has been found by experiments that antistatic properties necessary for garments, carpets and other interior decoration are expressed by a frictional voltage at a 40% relative humidity of less than 2500 volts, preferably less than 2000 volts. It is seen from the above results that even if the composition of the copolymer (B) of acrylonitrile and methoxy polyethylene glycol methacrylate and the amount of it added to polymer (A) are the same, the resulting effect differs considerably depending upon the degree of polymerization of the copolymer (B), and that if the intinsic viscosity in dimethyl formamide of the copolymer (B) is less than 0.8, there is only a little antistatic effect. In other words, it has been found that the effect becomes remarkably stronger if the molecules of the antistatic agent having a size greater than a certain value are dispersed in the fibers.

EXAMPLE 7

With the use of azobisisobutyronitrile as a polymerization initiator and in dimethyl sulfoxide, acrylonitrile polymers (A) composed of acrylonitrile and methylacrylate or further sodium allyl sulfonate, acrylonitrile copolymers (B) composed of acrylonitrile and

or further sodium allyl sulfonate or sodium acrylate or diethyl aminoethyl methacrylate, and acrylonitrile polymers (A″) composed of acrylonitrile and sodium allyl sulfonate were prepared. They were mixed with each other in a manner such that the amount of $\text{-(OCH}_2\text{CH}_2\text{)}_{30}$ in the acrylonitrile copolymer (B) might be 2% by weight of the total amount of these polymers. When the acrylonitrile polymer (A″) is added, the mixing was effected so that its amount might be 1% by weight of the total amount of these polymers. The compositions of these polymers are shown below.

|   | AN Polymer (A) | | | AN copolymer (B) | | | AN polymer (A″) | |
|---|---|---|---|---|---|---|---|---|
|   | AN | MEA | SAS | AN | PAGA | SAS | AN | SAS |
| A | 93 | 7 | 0 | 45 | 55 | 0 | 0 | 0 |
| B | 93 | 6 | 1 | 45 | 55 | 0 | 0 | 0 |
| C | 93 | 6 | 1 | 45 | 55 | 0 | 90 | 10 |
| D | 93 | 7 | 0 | 42 | 55 | 3 | 0 | 0 |
| E | 93 | 6 | 1 | 42 | 55 | 3 | 0 | 0 |
| F | 93 | 7 | 0 | 42 | 55 | 3 | 90 | 10 |
| G | 93 | 6 | 1 | 42 | 55 | 3 | 90 | 10 |
| H | 93 | 7 | 0 | 45 | 55 | 0 | 80 | [1] 20 |
| I | 93 | 6 | 1 | 40 | 50 | [1] 10 | 0 | 0 |
| J | 93 | 7 | 0 | 45 | 55 | [1] 0 | 80 | 20 |
| K | 93 | 7 | 0 | 44 | 50 | [2] 6 | 0 | 0 |

[1] Sodium acrylate was the monomer used.
[2] Diethylaminoethyl methacrylate was the monomer used.
NOTE.—AN=acrylonitrile.
MEA=methyl acrylate.
SAS=sodium allyl sulfonate.

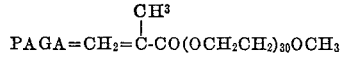

Spinning solutions A′ to K′ were prepared by dissolving these polymers into 4 times their weight of dimethyl sulfoxide. Tows were prepared by spinning in the same manner as described in Example 1, and the antistatic effect was measured. The results are as follows:

| Spinning solution | Frictional voltage (volt) | Half life (Second) | Ash test (cm.) |
|---|---|---|---|
| A′ | 1,500 | 13 | 1.5 |
| B′ | 1,400 | 14 | 1.4 |
| C′ | 1,000 | 9 | 0.5 |
| D′ | 800 | 6 | 0 |
| E′ | 800 | 6 | 0 |
| F′ | 500 | 4 | 0 |
| G′ | 500 | 4 | 0 |
| H′ | 1,300 | 12 | 1.0 |
| I′ | 1,000 | 8 | 0.3 |
| J′ | 800 | 7 | 0 |
| K′ | 1,100 | 12 | 1.0 |
| Control | 6,800 | ([1]) | 7.0 |

[1] Above 300.

It is seen from the above results that when the acrylonitrile polymer (B) contains an ionizable monomer, particularly sulfonic acid radical, the antistatic effect is remarkably facilitated, and that when the acrylonitrile polymer (A″) contains an ionizable monomer, particularly a monomer containing sulfonic acid radical, a big antistatic effect can be imparted.

EXAMPLE 8

A monomeric mixture consisting of 92 parts of acrylonitrile, 1 part of sodium allyl-sulfonate and 7 parts of methyl acrylate was subjected to polymerization in dimethyl sulfoxide with the use of azobisisobutyronitrile as a polymerization initiator. The resulting acrylonitrile polymer (A) was blended with a polymer (B) prepared in the same manner from a monomeric mixture consisting of 49 parts of acrylonitrile, 1 part of sodium allyl-sulfonate and 50 parts of

in a manner such that the amount of $\text{-(OCH}_2\text{CH}_2\text{)}_{30}$ might be 2, 3 and 5% by weight of the total amount of the polymers. Spinning solutions B, C and D were prepared by dissolving the resulting polymers into four times their weight of dimethyl sulfoxide. For the sake of comparison, spinning solution A was prepared by dissolving the polymer (A) alone into dimethyl sulfoxide in the same manner as mentioned above.

Each of the obtained spinning solutions was spun through a spinneret with 400 holes into a 55% aqueous solution of dimethyl sulfoxide, and then drawn to five times. An oil preparation was applied to the resulting filaments, which were then given crimps of 15 turns per 2.5 cm. Staples A, B, C and D having a monofilament denier of 3.0 and a cut length of 51 mm. were obtained. Each of the staples was dyed under the following conditions.

|   | Conditions under which K Value is measured | Conditions under which L Value is measured |
|---|---|---|
| Dyestuff | Malachite Green (C.I. Basic Green 4). | Malachite Green (C.I. Basic Green 4). |
| Dyestuff concentration | 10.0% o.w.f. | 10.% o.w.f. |
| pH | 4.0 | 4.0. |
| Sodium acetate | 0.5% o.w.f. | 0.5% o.w.f. |
| Dyeing time | 420 minutes. | 420 minutes. |
| Dye bath ratio | 1:100 | 1:100. |
| Dye temperature | 70±1° C. and 99±1° C. | 70±1° C. and 99±1° C. |
| Dyeing apparatus | Shaking type dyeing apparatus in which the shaking is effected 100 times per minute. | Shaking type dyeing apparatus in which the shaking is effected 100 times per minute. |

The K value is a ratio of saturated dye absorption, namely $$\frac{\text{Amount of dye absorption at 70° C.}}{\text{Amount of dye absorption at 100° C.}}$$

and the L value is an amount of dye exhaustion when dyeing is carried out for 20 minutes at 70° C. The results are shown below.

| Staple | A (control) | B | C | D |
|---|---|---|---|---|
| Amount of the dyeing site (10⁵ MEQ/g.) | 7.1 | 7.1 | 7.1 | 7.1 |
| K Value | 0.045 | 0.2 | 0.45 | 0.62 |
| L value (mg./g.) | 0.3 | 2.1 | 3.8 | 4.8 |

It is seen from these results that the staples B, C and D obtained from the acrylonitrile polymer composition of this invention have more excellent dyeability at low temperatures than the conventional acrylonitrile staple (staple A).

We claim:
1. An acrylonitrile polymer composition comprising an acrylonitrile polymer (A) selected from acrylonitrile homopolymers and copolymers of acrylonitrile with up to 60% by weight of a copolymerizable vinyl monomer other than (1) below and an acrylonitrile copolymer (B) containing 30 to 80% by weight of a comonomer represented by the following Formula 1:

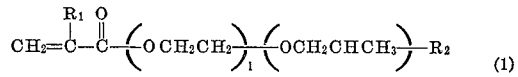

(1)

wherein $R_1$ is a member selected from a hydrogen atom and a lower alkyl group; $R_2$ is a member selected from the group consisting of halogen atoms other than fluorine and organic residues selected from hydroxyl, alkoxy of up to 18 carbon atoms, alkylthio of up to 18 carbon atoms, amino, phenoxy, naphthoxy and derivatives thereof: $l$ is a positive integer having an average value of not less than about 20; and $m$ is zero or a positive integer, which may further contain other copolymerizable vinyl comonomer having an ionizable radical, the amount of $(OCH_2CH_2)_l$ present in the comonomer of the Formula 1 being in the range of 0.2 to 15% by weight of the total amount of the polymers (A) and (B).

2. The composition according to claim 1 wherein the above Formula 1, $R_1$ is a member selected from the group consisting of a hydrogen atom and a lower alkyl group with 1 to 2 carbon atoms; $l$ is a positive integer having an average value of about 20 to 100, preferably 25 to 75, and $m$ is zero or a positive integer having an average value of up to about $\frac{1}{2}l$.

3. The composition according to claim 1 wherein the $(OCH_2CH_2)_l$ present in the comonomer of the Formula 1 is in the amount of 0.3 to 10% by weight.

4. The composition according to claim 1 wherein the comonomer represented by the Formula 1 is in the amount of 45 to 65% by weight.

5. The composition according to claim 1 wherein the polymer components of the said compositions contain other copolymerizable vinyl monomer having an ionizable radical.

6. The composition according to claim 5 wherein the ionizable radical of the said comonomer is an anion and is present as a constituent of the polymer (A) in an amount of 0.1 to 2.0 mol percent.

7. The composition according to claim 5 wherein the ionizable radical of the said comonomer is a cation, and is present as a constituent of the polymer (A) in an amount of 0.4 to 4.0 mol percent.

8. The composition according to claim 5 wherein the other copolymerizable vinyl monomer having the ionizable radical is present as a constituent of the copolymer (B) in an amount of 0.5 to 10 mol percent.

9. The composition according to claim 5 wherein the other copolymerizable vinyl monomer having the ionizable radical is present, besides the polymer (A) and copolymer (B), in the form of a copolymer with acrylonitrile in an amount of 5 to 15 mol percent.

10. The composition according to claim 6 wherein the ionizable radical of the said comonomer is a sulfonic acid group.

11. The composition according to claim 6 wherein $(OCH_2CH_2)_l$ in the comonomer of the Formula 1 is in the amount of 2 to 10% by weight.

12. Acrylonitrile fibers made from the composition of claim 1.

13. The acrylonitrile fibers according to claim 12 wherein the said composition is a component of a side-by-side composite fiber.

14. The fibers according to claim 12 wherein the copolymer (B) has an intrinsic viscosity of at least 0.8 as measured in a dimethyl formamide solution of 0.1 N sodium rhodanate at 25° C.

15. The composition of claim 8 wherein the ionizable radical of said comonomer is a sulfonic acid group.

16. The composition of claim 9 wherein the ionizable radical of said comonomer is a sulfonic acid group.

17. The composition of claim 1 wherein said copolymerizable vinyl monomer of (A) is selected from the group consisting of acrylic acid, methacrylic acid and ester and salts thereof; itaconic acid and salts thereof; sulfonic acid group containing vinyl monomers and salts thereof; cationic radical containing vinyl monomers; vinyl acetate, vinyl chloride; and vinylidene chloride.

18. The composition of claim 17 wherein said copolymerizable vinyl monomer of (A) is selected from acrylic and methacrylic acid and esters thereof, vinyl acetate and vinyl monomers containing a sulfonate group.

19. The composition of claim 1 wherein said vinyl comonomer, having an ionizable radical of (B) is selected from acrylic acid, methacrylic acid and salts thereof, itaconic acid and salts thereof, vinyl monomers containing a sulfonate group and salts thereof, and vinyl monomers having an ionizable cationic radical.

References Cited
UNITED STATES PATENTS

| | | | |
|---|---|---|---|
| 3,341,627 | 9/1967 | Willkinson | 260—898 |
| 3,035,031 | 5/1962 | Evans | 260—85.5 |

MURRAY TILLMAN, Primary Examiner

C. J. SECCURO, Assistant Examiner

U.S. Cl. X.R.

260—895; 264—182